(12) United States Patent
Maggi

(10) Patent No.: US 12,451,679 B2
(45) Date of Patent: Oct. 21, 2025

(54) FLUSH-TO-WALL ELECTRICAL BOX

(71) Applicant: CONTACT ITALIA SRL, Altamura (IT)

(72) Inventor: Pietro Antonio Maggi, Altamura (IT)

(73) Assignee: CONTACT ITALIA SRL, Altamura (IT)

( * ) Notice: Subject to any disclaimer, the term of this patent is extended or adjusted under 35 U.S.C. 154(b) by 207 days.

(21) Appl. No.: 18/555,273

(22) PCT Filed: Apr. 13, 2022

(86) PCT No.: PCT/IB2022/053476
§ 371 (c)(1),
(2) Date: Oct. 13, 2023

(87) PCT Pub. No.: WO2022/219556
PCT Pub. Date: Oct. 20, 2022

(65) Prior Publication Data
US 2024/0204500 A1      Jun. 20, 2024

(30) Foreign Application Priority Data

Apr. 14, 2021 (IT) .................. 102021000009320

(51) Int. Cl.
*H02G 3/00* (2006.01)
*H02G 3/12* (2006.01)
*H02G 3/14* (2006.01)

(52) U.S. Cl.
CPC ............... *H02G 3/12* (2013.01); *H02G 3/14* (2013.01)

(58) Field of Classification Search
CPC .................... H02G 3/12; H02G 3/14
See application file for complete search history.

(56) References Cited

U.S. PATENT DOCUMENTS

| 11,476,651 | B1* | 10/2022 | Mon ................ H02G 3/123 |
| 11,784,478 | B1* | 10/2023 | Nassim ............. H02G 1/00 |
| | | | 174/502 |
| 2019/0312420 | A1 | 10/2019 | Korcz et al. |
| 2022/0329056 | A1* | 10/2022 | Gow .............. H02G 3/081 |

FOREIGN PATENT DOCUMENTS

| DE | 10229930 A1 | 1/2004 |
| EP | 2187492 A1 | 5/2010 |
| EP | 2648296 A2 | 10/2013 |
| GB | 2440468 A | 1/2008 |
| IT | 201800001528 A1 | 7/2019 |
| WO | 2009/122242 A1 | 10/2009 |

OTHER PUBLICATIONS

International Search Report and Written Opinion issued on Jun. 7, 2022, in corresponding International Application No. PCT/IB2022/053476, 12 pages.

* cited by examiner

*Primary Examiner* — Pete T Lee
(74) *Attorney, Agent, or Firm* — Maier & Maier, PLLC

(57) ABSTRACT

A flush-to-wall electrical box including: a box-like body, perimeter fixing walls, a perimeter edge; a first frame; a front closing profile that can be removably fixed to the frame. The front closing profile is equipped with a plurality of safety teeth and the first frame is equipped with a plurality of lateral flap and with a plurality of thrust flaps.

11 Claims, 12 Drawing Sheets

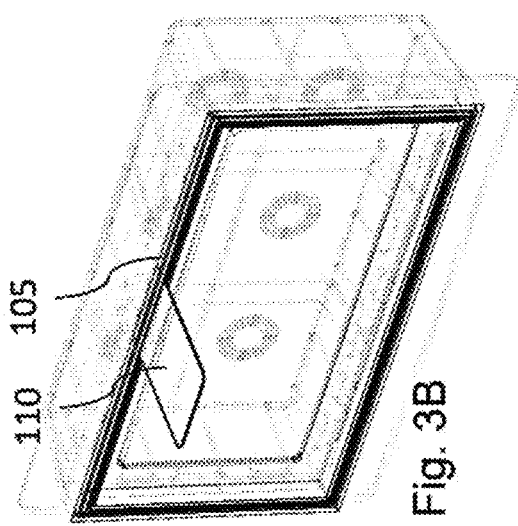
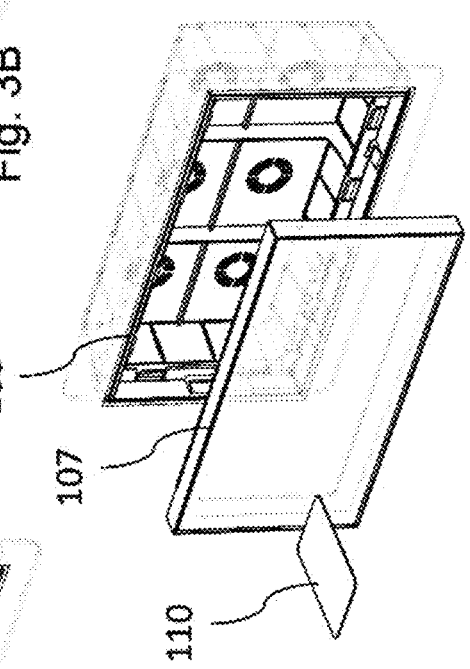
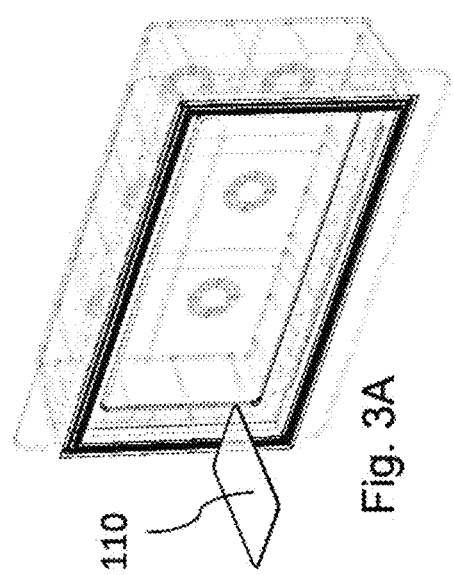
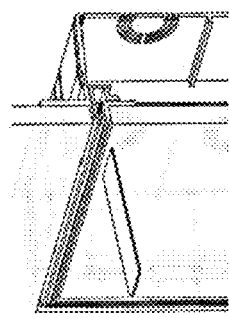

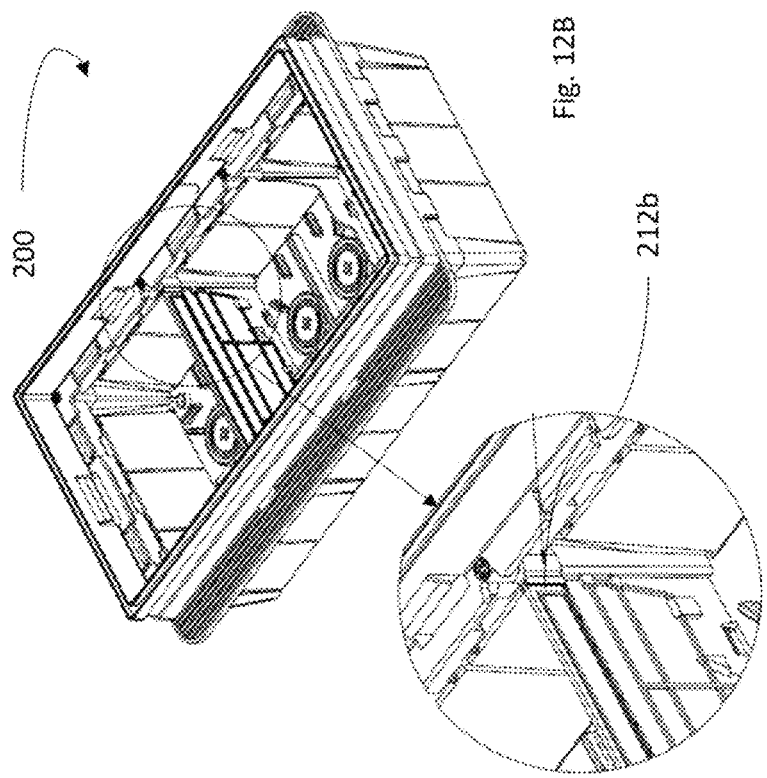
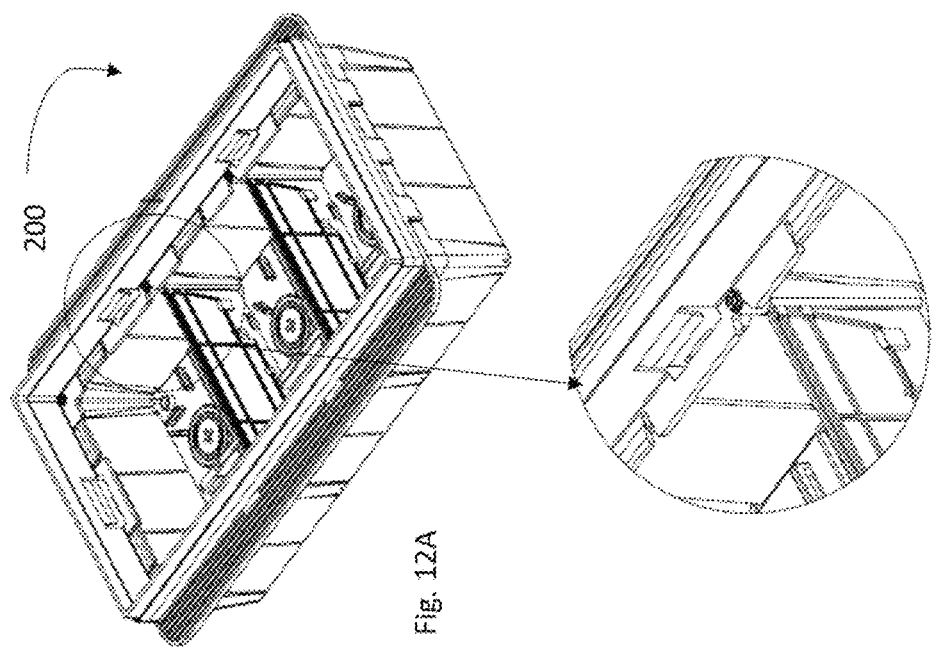
Fig. 12

FLUSH-TO-WALL ELECTRICAL BOX

FIELD

The present invention relates to a flush-to-wall electrical box.

BACKGROUND

As is known, there are various solutions for flush-to-wall electrical boxes.

A first known solution is reported in patent application IT102012902103136 which describes a box for the installation and wiring of electrical devices comprising a box-like body open at the front, perimeter walls and a perimeter edge comprising fixing means, and in particular a plurality of fins perpendicular to the bottom and parallel to the fixing wall.

A second solution is reported in the patent application WO2009122242 which describes an electrical panel having a back wall and a side wall that defines a compartment for electrical components, a mask to be applied to a free end of the side wall. The housing is designed to be recessed into a wall and has a front edge and a front panel to be applied to the housing in order to close the internal space. The panel has a visible surface which, when said panel is closed, is coplanar and surrounded by the leading edge of the mask.

A third solution is reported in patent application IT102018000001528 which describes a junction box that can be installed on the wall and in particular in plasterboard walls. The box comprises a base structure, able to define a housing volume for electric cables and other components, which comprises a bottom wall, perimeter walls and a perimeter edge. The junction box also comprises a through hole defined in correspondence with the perimeter edge, an abutment support, a threaded pin, housed in the through hole, an elongated locking element that can be screwed onto the threaded pin. The perimeter wall comprises a guiding surface configured in such a way that when screwing the elongated locking element onto the threaded pin it slides on the guiding wall, moving from a position proximal to the perimeter wall to a position protruding towards the outside of the wall perimeter. The junction box includes removable fixing s that protrude from the perimeter walls towards the outside of the base structure.

A fourth solution is reported in patent application GB2440468A which describes a housing for an electrical panel comprising a rear panel and one or more side walls that delimit a semicircular area. At least one peripheral flange is included with a protrusion adjacent to an opening that provides an elastic movement of the engaging protuberance of the lid. The lid can be equipped with a hole to hook onto the engagement flap.

A fifth solution is reported in European patent application EP2648296 which describes a modular electrical device, particularly for switches, sockets and other electrical components to be applied to a wall, which comprises a frame and one or more electrical components which can be fixed to the frame; the frame includes engaging elements adapted to engage gripping elements provided on the electrical components to be associated with the frame. The engagement members and the gripping members comprise axial guide means, suitable for allowing the guided sliding of the electrical component with respect to the frame, and locking means for blocking the axial movement of the electrical component with respect to the frame. Said guide means comprise inverted dovetail elements, inserted and sliding along external profiles of the frame. The locking means comprise at least one tooth, associated with an elastically deformable and snap-engageable part. The locking means can be disengaged by acting on the elastic wall by applying a slight pressure.

A sixth solution is reported in patent application US2019/0312420A1 which describes an electrical box which includes a base, a mobile element and an actuator, for example a screw. The base is configured to mate with the cassette and includes a flange and has slots that can be aligned with the threaded holes in the base, so that the distance between the base and the movable element is adjustable by means of a screw.

However, the known solutions suffer from the problem of not limiting the risk of breaking the plasterboard or masonry around the box during the operations of use (opening and closing).

Furthermore, the known solutions do not provide a homogeneous and optimized aesthetics when installed on plasterboard walls, since there are always visible plastic parts which inevitably are of different colour from the paint of the walls.

SUMMARY

The purpose of the present invention is to provide a flush-to-wall electrical box capable of providing optimized installation and opening/closing operations, without the risk of breakage or cracks, and at the same time providing a homogeneous aesthetic appearance to the portion of the wall in which the box is installed, therefore having characteristics such as to overcome the limits of the currently known electrical boxes.

According to the present invention, a flush-to-wall electrical box is realized.

BRIEF DESCRIPTION OF THE DRAWINGS

For a better understanding of the present invention, a preferred embodiment is now described, purely by way of non-limiting example, with reference to the attached drawings, in which:

FIG. 3A shows a schematic view of the flush-to-wall electrical box of FIG. 1 when with an external card, according to the invention;

FIG. 3B shows a schematic view of the flush-to-wall electrical box of FIG. 1 when with the external card inserted between the box and its lid, according to the invention;

FIG. 3C shows a schematic view of the flush-to-wall electrical box of FIG. 1 with the disassembled card according to the invention;

FIG. 3D shows a schematic view of the flush-to-wall electrical box with a detail thereof, according to the invention;

FIG. 12A shows a three-dimensional view of a configuration of internal separators, in case of single plasterboard sheet, in the electrical box according to the invention;

FIG. 12B shows a three-dimensional view of configuration of internal separators, in case of double plasterboard sheets, in the electrical box according to the invention.

With reference to FIG. 1, a first embodiment of a flush-to-wall electrical box 100 is shown comprising:
 a box-like body 101 able to define a housing volume for electrical and corrugated cables,
 perimeter fixing walls 102,
 a perimeter edge 103.

The flush-to-wall electrical box 100 is configured to be fixed to a wall, also in plasterboard, by means of the perimeter fixing walls 102 and/or by means of holes made in the bottom of the box-like body 101.

Figure 1:
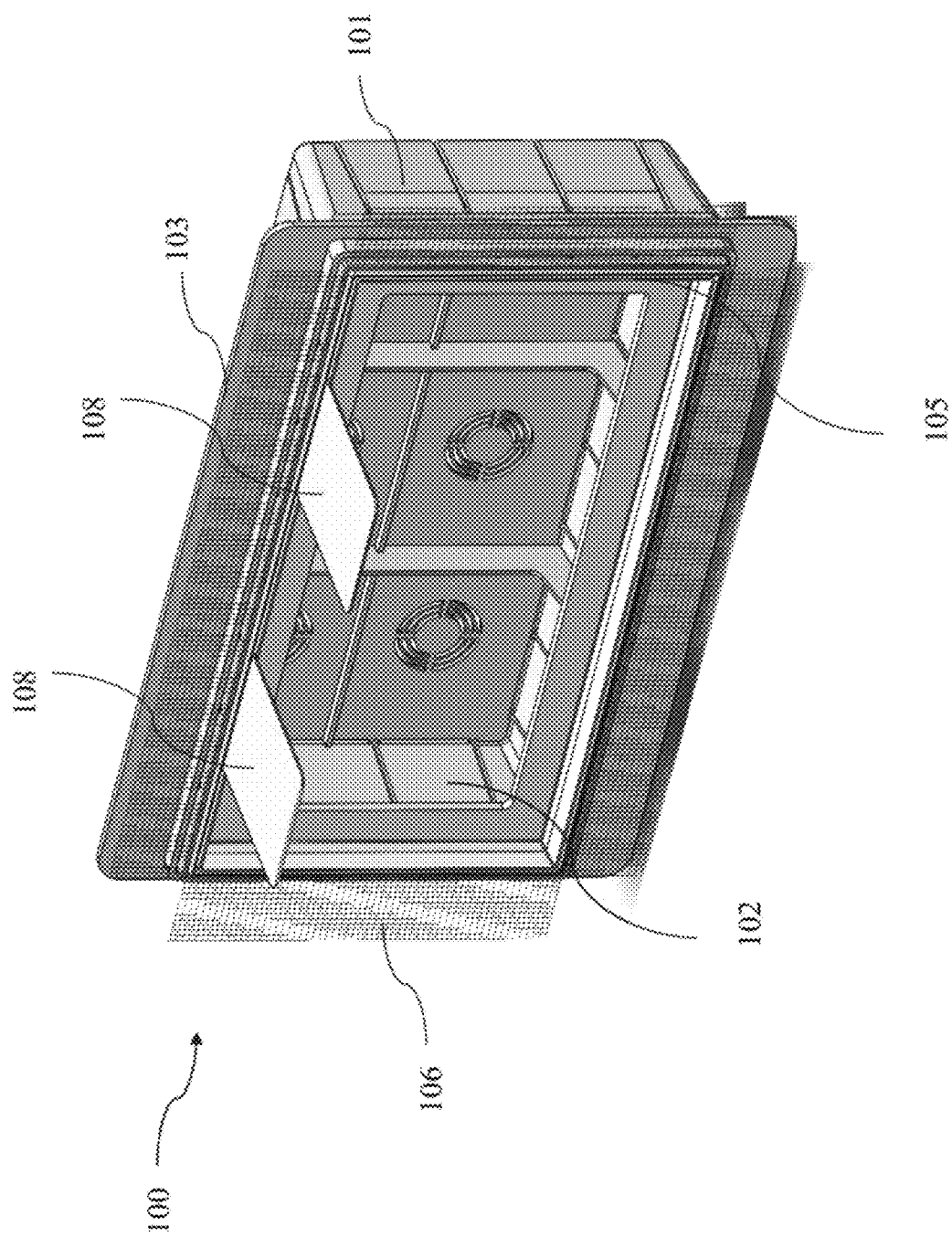
FIG. 1 shows a three-dimensional schematic view of a first embodiment of a flush-to-wall electrical box, according to the invention.
Figure 2:
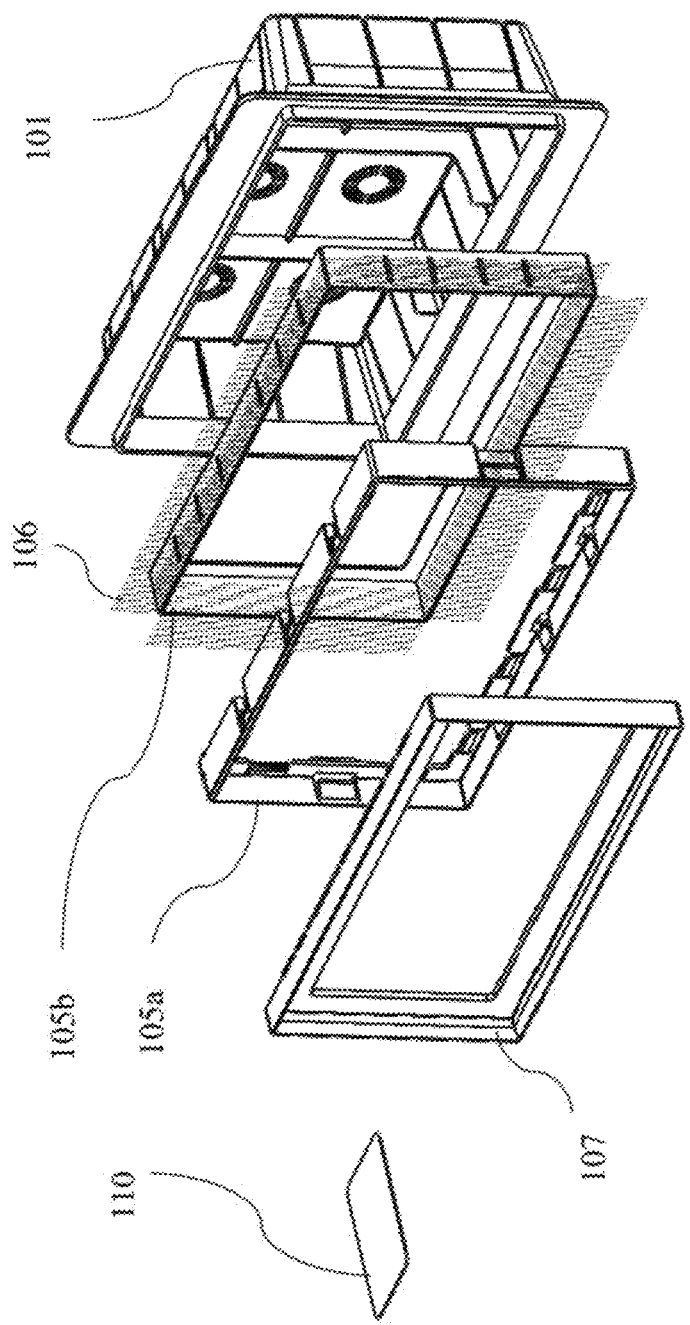
FIG. 2 shows a disassembled schematic view of the flush-to-wall electrical box of FIG. 1, according to the invention.

According to an aspect of the invention, the electrical box 100 comprises a first frame 105 composed of a first profile 105a and a second profile 105b and a net 106 interposed between the first profile 105a and the second profile 105b, as shown in FIG. 2.

According to an aspect of the invention, the net 106 protrudes beyond the perimeter edge 103, advantageously avoiding the formation of cracks at the edges of the electrical box 100. In use, the filler and paint for smoothing the wall are applied to the net 106.

According to an aspect of the invention, as shown in FIG. 3, the electrical box 100 also includes a front closing profile 107, or lid, designed to close the space inside the box-like body 101.

According to one aspect of the invention, the front closing profile 107 is centrally perforated, as shown in FIG. 2.

In this way, a portion of plasterboard can be inserted in the front closing panel 107 in such a way as to make the wall in which the electrical box 100 is installed visually homogeneous.

The perforated portion of the front closing profile 107 is preferably rectangular in shape and having internal profiles such as to support a plasterboard closure panel.

Figure 4:
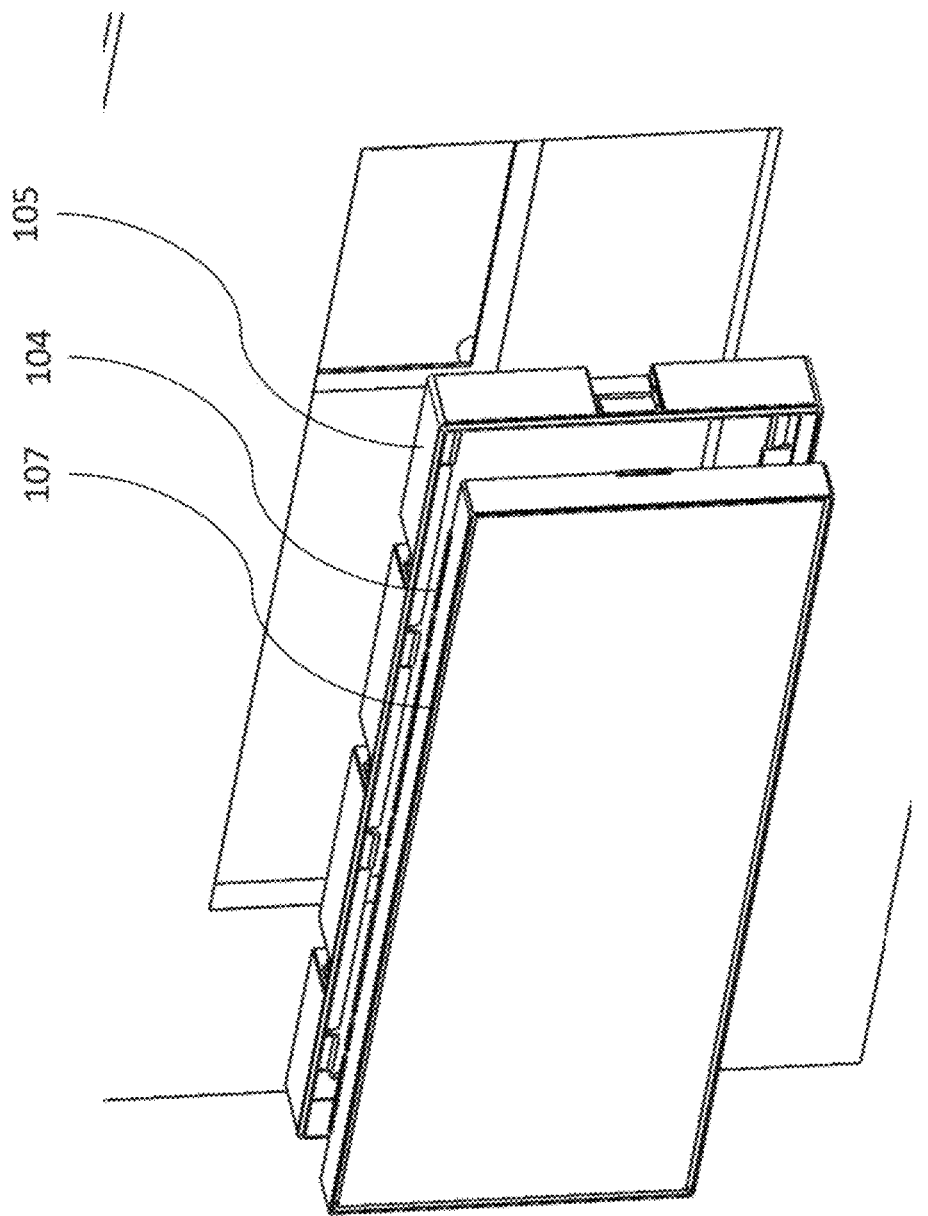
FIG. 4 shows a three-dimensional schematic view of the flush-to-wall electrical box of FIG. 1 and in particular of a system for locking the lid to the frame, according to the invention.
Figure 5:
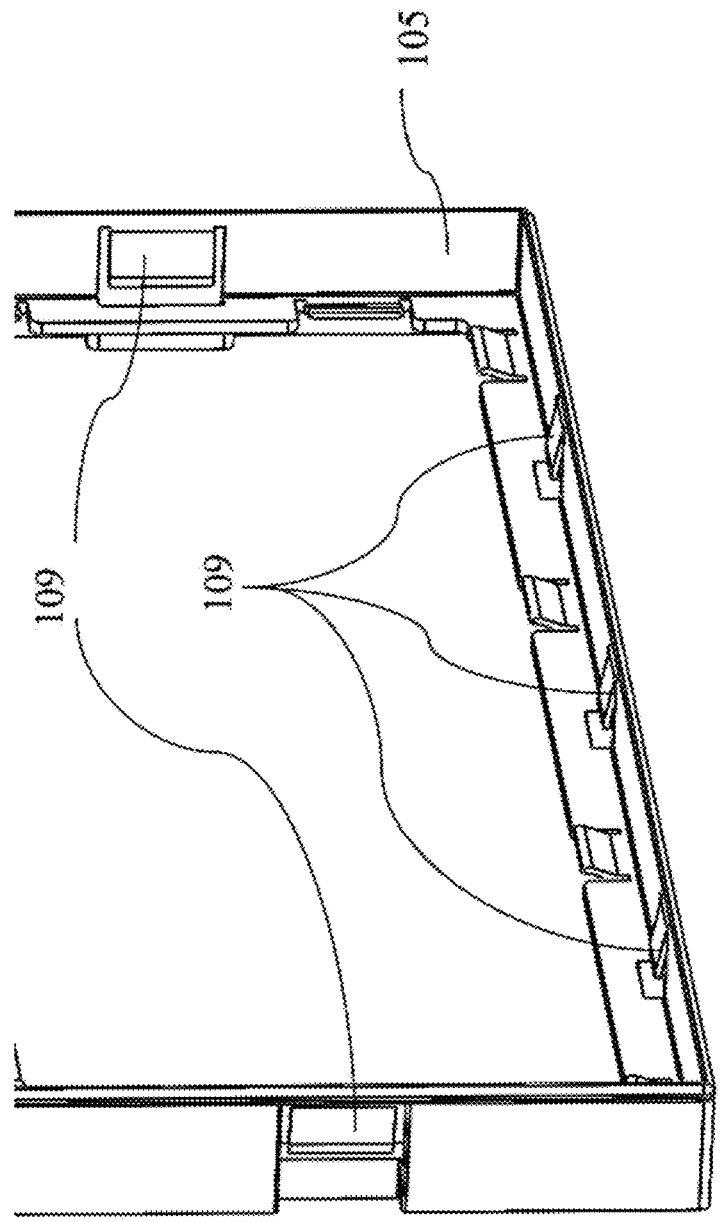
FIG. 5 shows a three-dimensional schematic view of a portion of a frame of the flush-to-wall electrical box of FIG. 1, according to the invention.

According to a further aspect of the invention, as shown in FIG. 4, the front closing profile 107 is equipped with a plurality of safety teeth 104 which can be snapped between the first frame 105 and the perimeter fixing walls 102, projecting orthogonally to the plane of the first frame 105. In particular, each safety tooth 104 of the plurality of safety teeth 104 can be snapped into a corresponding plurality of lateral flaps 109 present in the perimeter of the first frame 105.

During installation, the front closing profile 107 is superimposed and fixed to the first frame 105 by initial sliding of each tooth 104 of the plurality of safety teeth 104 on the corresponding lateral flap 109, and subsequent snap locking.

Figure 6:
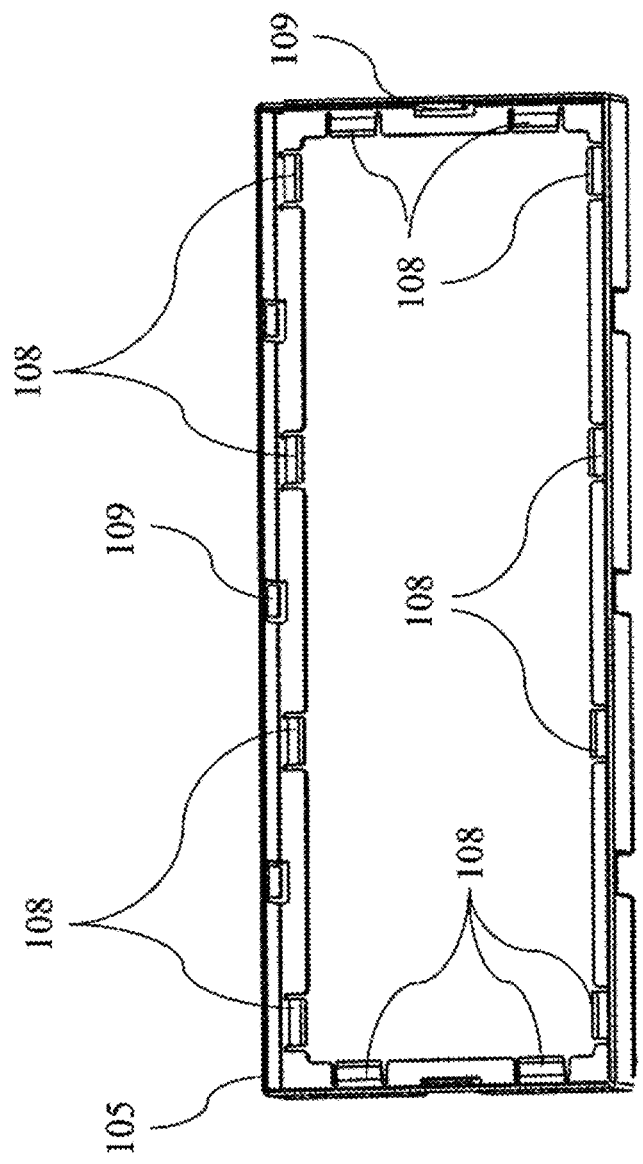
FIG. 6 shows a front view of the frame of the flush-to-the-wall box of FIG. 1, according to the invention.

Furthermore, according to an aspect of the invention, the first frame 105 comprises a plurality of thrust flaps 108, shown in FIG. 6, which are compressed when in use, the front closing profile 107 is snap-fixed on the first frame 105.

The thrust flaps 108 are configured to facilitate the release of the closing profile 107 when a flat element having a suitable thickness is interposed between the closing profile 107 and the first frame 105, for example, according to a preferred embodiment, the flat element 110 shown in FIG. 3.

As shown in FIG. 6, the plurality of lateral flaps 109 is placed perimeter, on an outer edge of the first frame 105, while the plurality of thrust flaps 108 is placed perimetrically on an inner edge of the frame 105.

According to another aspect of the invention, the electrical box 100 comprises a system for adjusting the distance between the first frame 105 and the box-like body 101.

In particular, in the case of application in plasterboard, the electrical box 100 has a plurality of screws housed in suitable seats located at each corner of the box-like body 101, said screws allowing the adjustment of the distance between the frame 105 and the box-like body 101, and therefore of the overall thickness of the electrical box 100 when installed.

According to another aspect of the invention, the adjustment of the distance between the frame 105 and the box-like body 101 takes place by means of a plastic element with the usual dimensions of the plasterboard walls in order to avoid manual adjustment and already have fixed thicknesses based on the standard.

Following the adjustment of the distance by means of the adjustment system, the frame 105, comprising the first profile 105a and the second profile 105b, is locked onto the box-like body 101.

According to a further aspect of the invention, the electrical box 100 comprises a system for releasing the front closing profile 107, for example consisting of a flat element 110, shown in FIG. 3, and the plurality of thrust flaps 108, shown in FIG. 6.

The flat element 110 can be inserted in use in the space interposed between the front closing profile 107 and the first frame 105, by inserting the flat element 110 in correspondence with one of the thrust flaps 108, this is defused since the distance with the front closing profile 107 increases, and the latter can be extracted without applying forces or levering on the perimeter of the electrical box 100, thus avoiding the risk of injury or cracks in the wall where the box is installed.

Figure 7:
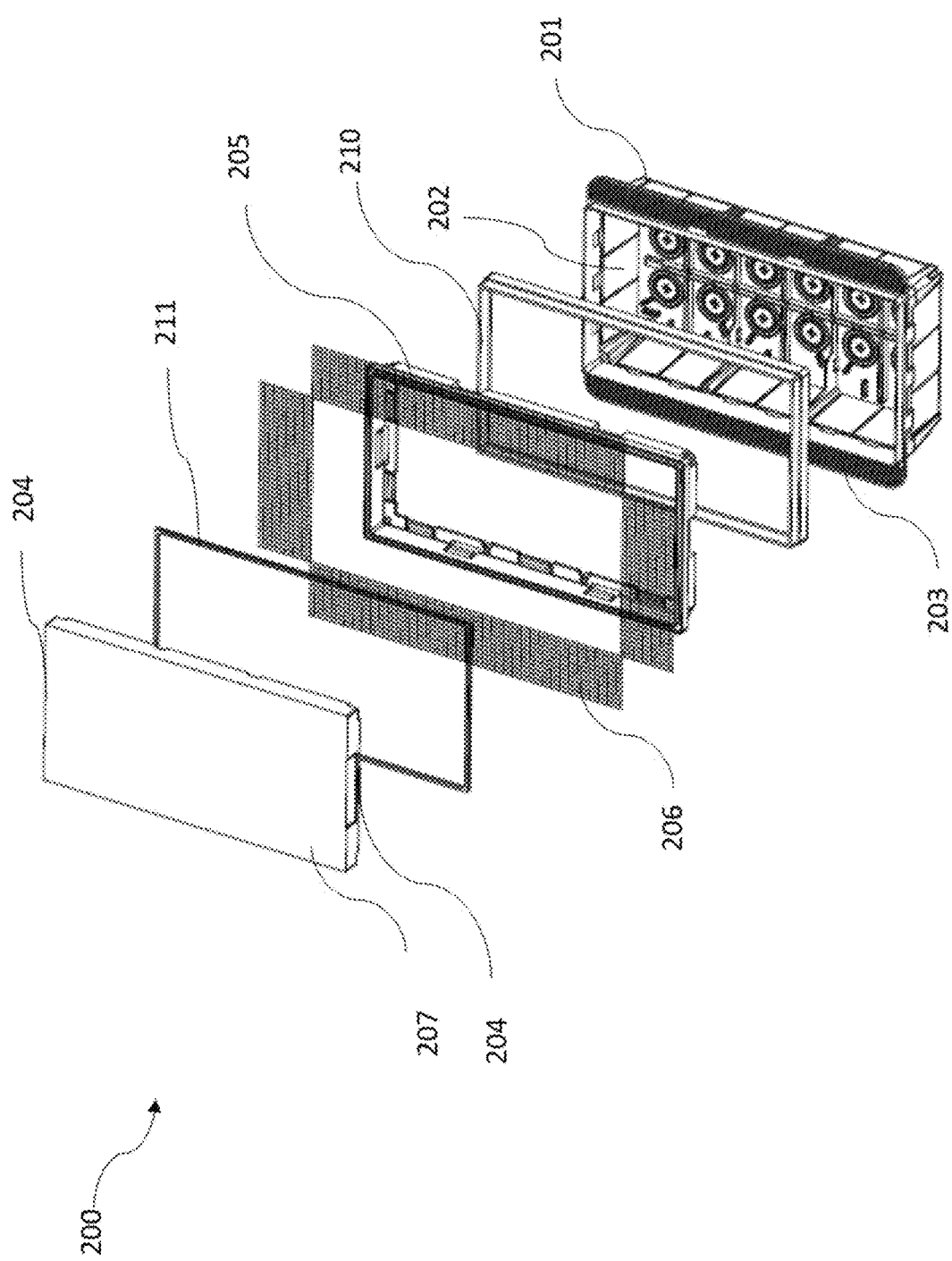
FIG. 7 shows a first disassembled schematic view of a second embodiment of the flush-to-wall electrical box, according to the invention.
Figure 8:
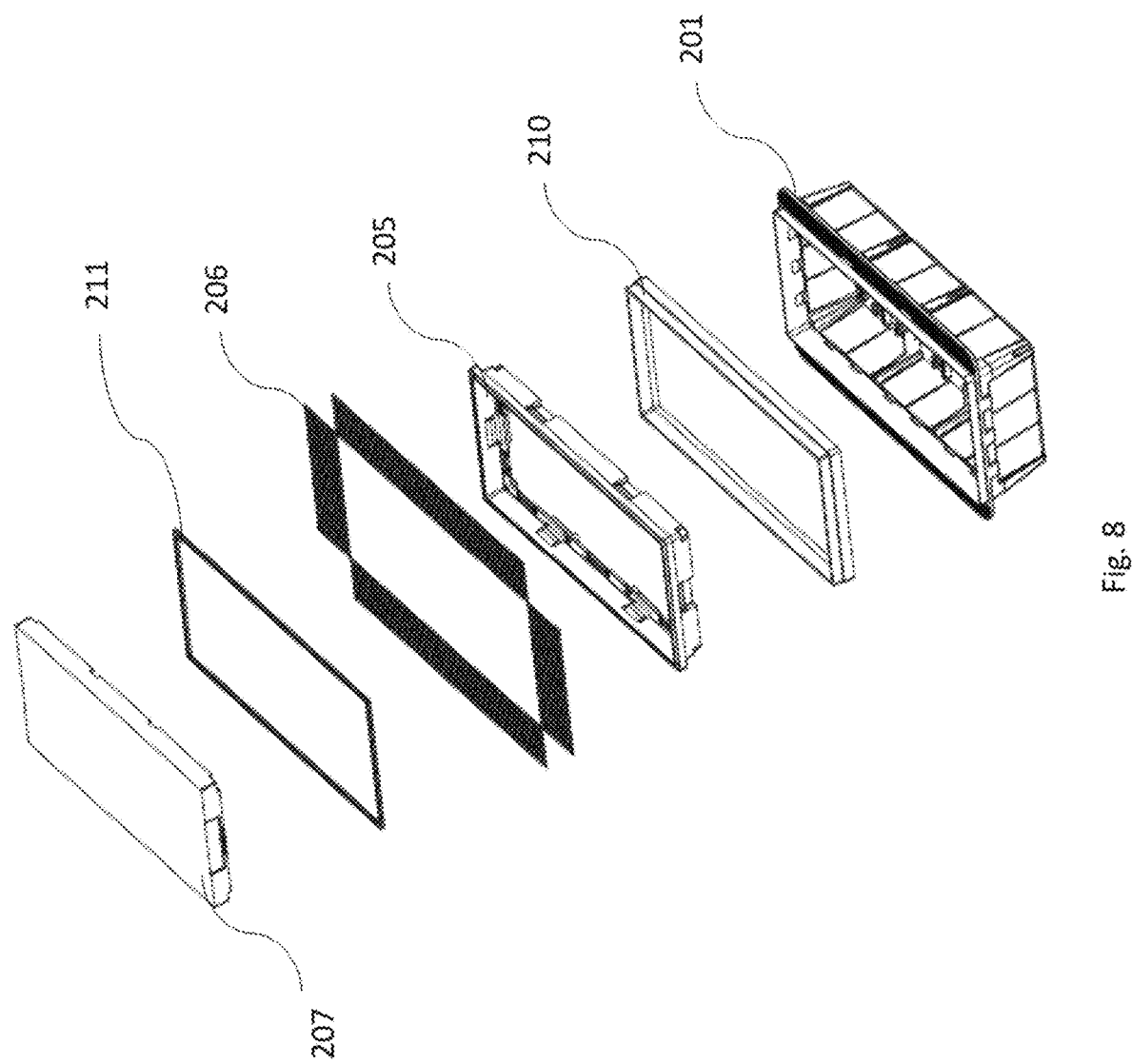
FIG. 8 shows a second disassembled schematic view of a second embodiment of the flush-to-wall electrical box, according to the invention.

FIGS. 7 and 8 show a second embodiment of the flush-to-the-wall electrical box 200 comprising: a box-like body 201 designed to define a housing volume for electric and corrugated cables, perimeter fixing walls 202, a perimeter edge 203. The flush-to-wall electrical box 200 is adapted to be fixed to a wall by means of the perimeter fixing walls 202 and/or by means of holes made in the bottom of the box-like body 201.

According to an aspect of the invention, the electrical box 200 comprises a first frame 205, a net 206 and a thin profile 211 coupled in the perimeter groove of the first frame 205 and by ultrasonic welding blocking the net 206.

Furthermore, the electrical box 200 comprises a second frame 210 underneath the first frame 205, interposed between the first frame 205 and the box-like body 201, and fixed by means of screws housed in suitable cavities of the first frame 205, to lock the assembly of first frame 205, second frame 210 and box-like body 201.

In this way, it is possible to mount this box even with double-sheeted plasterboard thicknesses, i.e. equal to 26 mm, rather than with normal plasterboard thickness equal to 13 mm.

According to an aspect of the invention, the net 206 protrudes beyond the perimeter edge 203, advantageously avoiding the formation of cracks at the edges of the electrical box 200.

According to an aspect of the invention, the electrical box 200 also includes a front closing profile 207, or lid, designed to close the space inside the box-like body 201.

According to a further aspect of the invention, the front closing profile 207 is equipped with a plurality of safety teeth 204, that can be snap fastened between the first frame 205, projecting orthogonally to the plane of the first frame 205.

Figure 9:
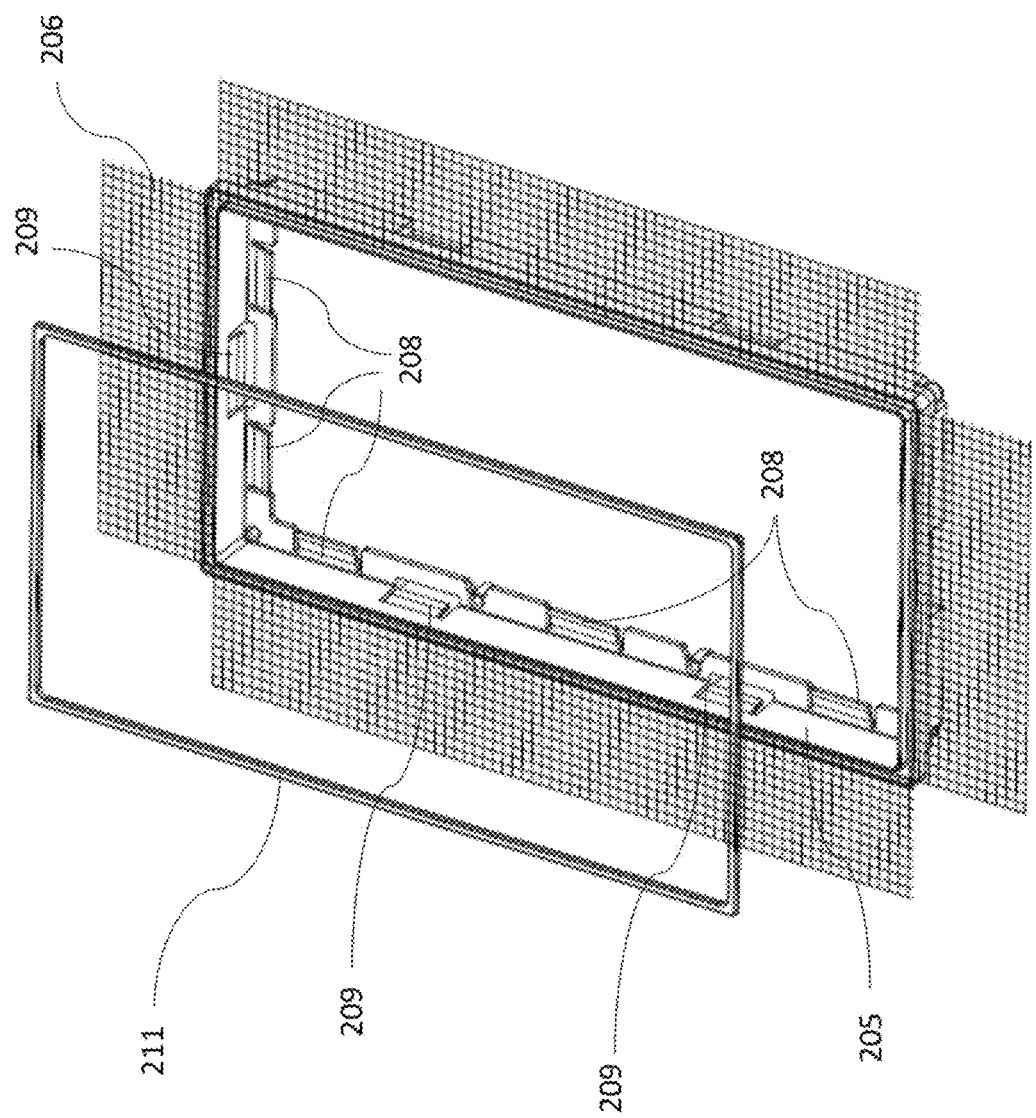
FIG. 9 shows a three-dimensional view of the frame with mesh and thin profile of the second embodiment of the flush-to-wall box, according to the invention.

In particular, each safety tooth 204 comprised in the plurality of safety teeth 204, can be snapped into a corresponding plurality of lateral flap 209 present in the perimeter of the first frame 205, shown in FIG. 9.

During installation, the front closing profile 207 is superimposed and fitted to the first frame 205 by initial sliding of each tooth 204, comprised in the plurality of safety teeth 204, on the corresponding lateral flap 209, and subsequent snap locking.

Furthermore, according to an aspect of the invention, the frame 205 comprises a plurality of thrust flaps 208, which are compressed when in use, the front closing profile 207 is snap-fixed on the frame 205.

The thrust flaps 208 are configured to ease the release of the closing profile 207 when a flat element having a suitable thickness is interposed between the closing profile 207 and the frame 205, for example, according to a preferred embodiment, the flat element 110.

As shown in FIG. 9, the plurality of lateral flaps 209 is placed perimeter, on an outer edge of the frame 205, while the plurality of thrust flaps 208 is placed perimetrically on an inner edge of the first frame 205.

According to another aspect of the invention, the electrical box 100 comprises a system for adjusting the distance between the first frame 205 and the box-like body 201. In particular, in the case of application in plasterboard, the electrical box 200 has a plurality of screws housed in suitable seats located at each corner of the box-like body 201, said screws allowing the adjustment of the distance between the first frame 205 and the box-like body 201, and hence the overall thickness of the electrical box 200 when installed.

According to another aspect of the invention, the adjustment of the distance between the frame 205 and the box-like body 201 takes place by means of a plastic element with the usual dimensions of the plasterboard walls in order to avoid manual adjustment and already have fixed thicknesses based on the standard.

Following the adjustment of the distance by means of the adjustment system, the frame 205 is locked on the box-like body 201.

According to a further aspect of the invention, the electrical box 200 comprises an unlocking system of the front closing profile 207, for example consisting of a flat element 210 and the plurality of thrust flaps 208.

The flat element 110 can be inserted in use in the space interposed between the front closing profile 207 and the first frame 205, by inserting the flat element 110 in correspondence with one of the thrust flaps 208, this is defused since the distance with the front closing profile 207 increases, and the latter can be extracted without applying forces or levering on the perimeter of the electrical box 200, thus avoiding the risk of injury or cracks in the wall where the box is installed.

According to an aspect of the invention, the front closing profile 207 comprises a perforated central portion having internal profiles such as to constitute a plastic cap.

Figure 10:
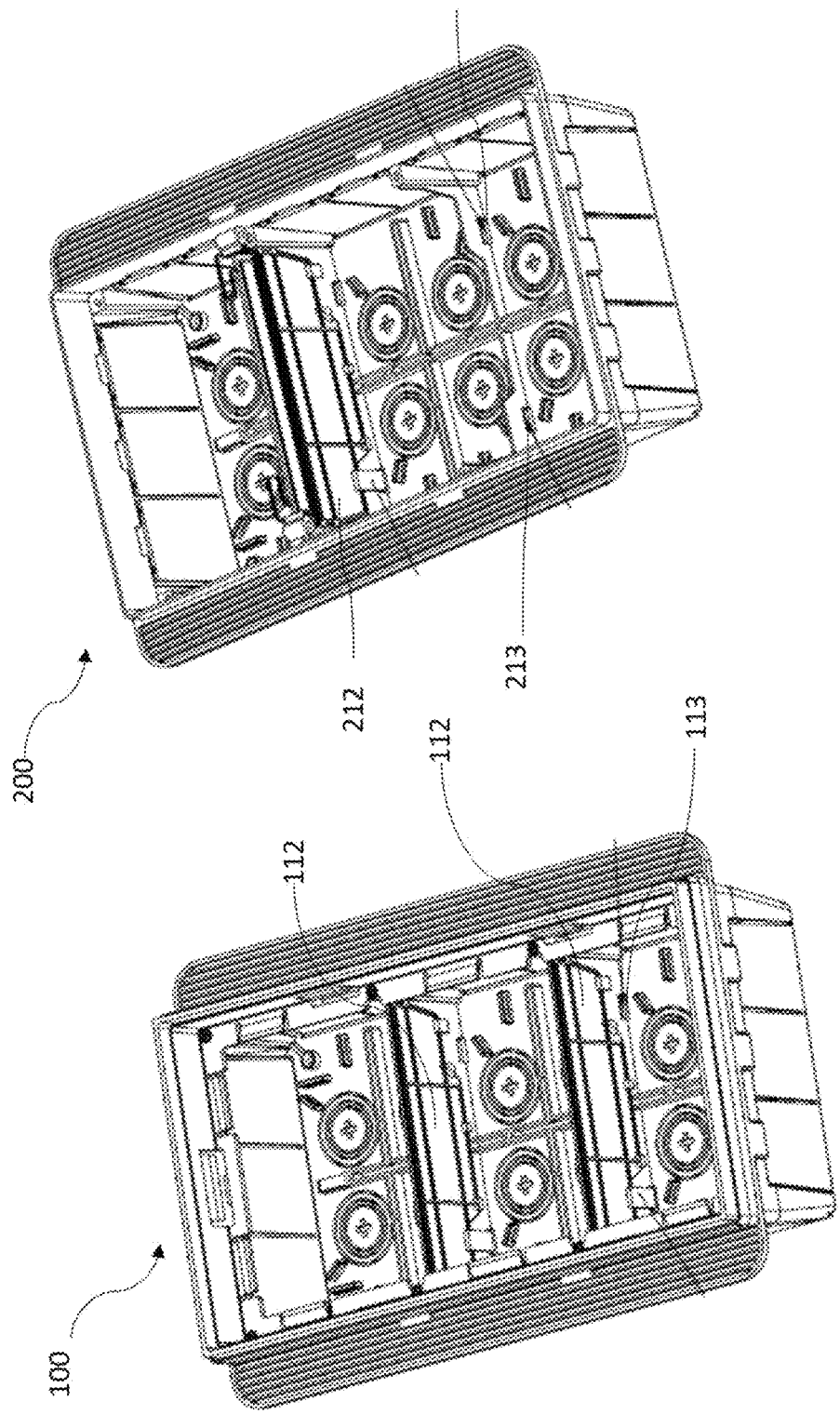
FIG. 10A shows a three-dimensional view of the first embodiment with internal separators, according to the invention.
FIG. 10B shows a three-dimensional view of the second embodiment with internal separators, according to the invention.

According to another aspect of the invention, as shown respectively in FIGS. 10A and 10B, the box-like body 101 of the first embodiment and 201 of the second embodiment include at least a separator 112, 212 useful for isolating the types of connections performed even for multiple systems.

Figure 11:
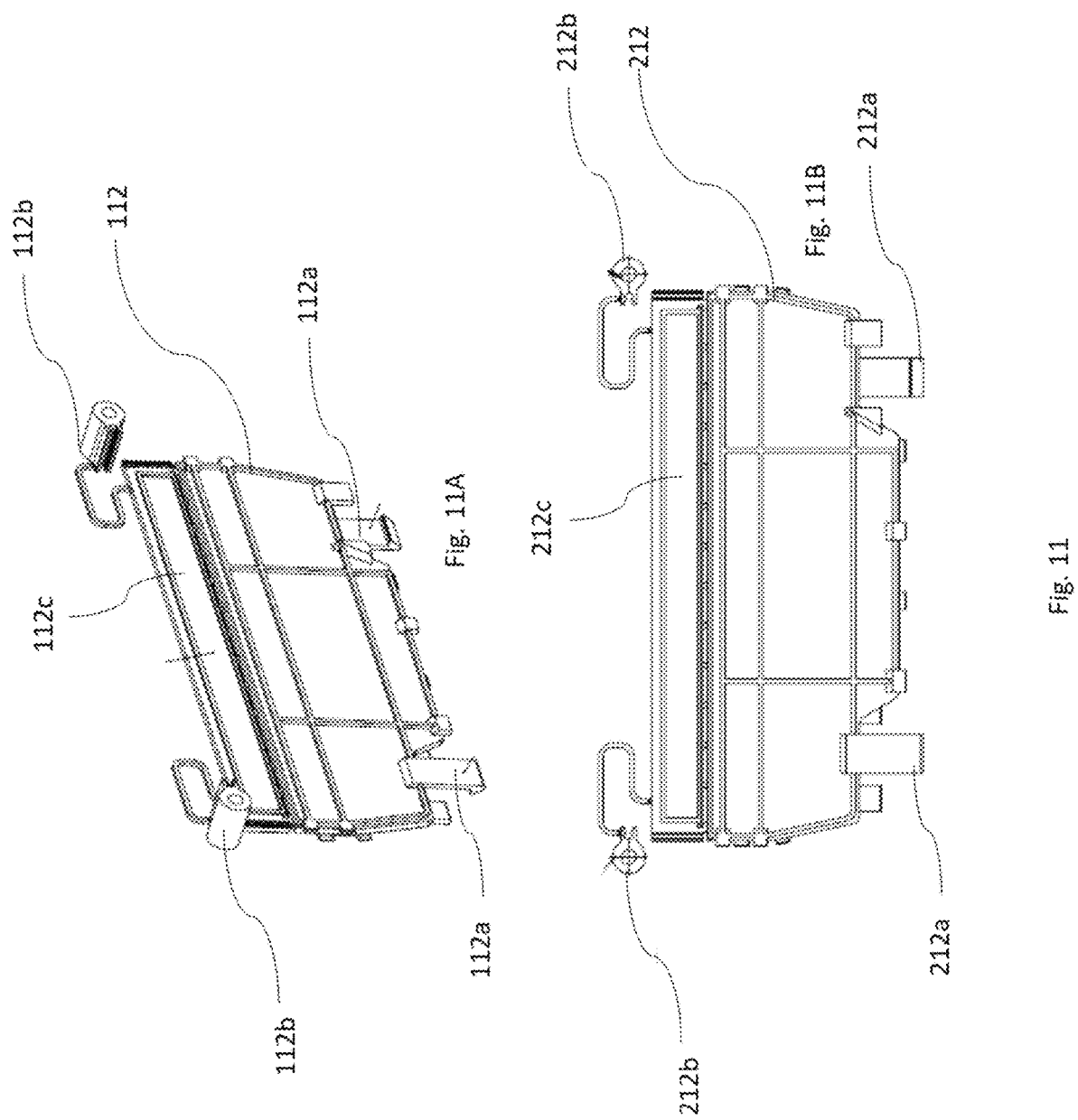
FIG. 11A shows a perspective view of the separator of FIG. 10A, according to the invention.
FIG. 11B shows a front view of the separator of FIG. 10B, according to the invention.

FIG. 11 shows a perspective view of the separator 112 and a front view of the separator 212. More particularly, the separator 112, 212 comprises two lower hooks 112a, 212a which can be coupled to corresponding slots 113, 213 present on the bottom of the box-like body 101, 201; a spacer 112b, 212b for each side, which can be suitably spaced; a pre-cut upper wall 112c, 212c that can be detached if necessary.

By manually detaching the upper wall 112c together with the two spacers 112b, the electrical box is mounted flush with the wall in the single sheet of plasterboard.

By detaching only the spacers 112b and placing them between the first frame 205 and the box-like body 201, assembly on a double sheet of plasterboard is carried out. The spacers 212b are pre-assembled before inserting the screw and are hooked to the same separator 212.

Therefore, the flush-to-the-wall electrical box 100 according to the invention avoids the formation of cracks at the edges.

In addition, the flush-to-the-wall electrical box 100 according to the invention can be applied to both a masonry wall and a plasterboard wall.

Another advantage of the flush-to-wall electrical box 100 according to the invention is to allow for optimal aesthetics as it visually disappears from the wall and allows it to be painted as desired.

Finally, the flush-to-the-wall electrical box 100 according to the invention allows it to be easily unhooked and hooked up, thanks to the front profile release system.

Finally, it is clear that modifications and variations can be made to the flush-to-wall electrical box 100, 200 according to the invention described and illustrated here without thereby departing from the protective scope of the present invention, as defined in the attached claims.

The invention claimed is:

1. A flush-to-wall electrical box comprising:
    a box-like body able to define a housing volume for electric and corrugated cables;
    perimeter fixing walls;
    a perimeter edge;
    a first frame;
    a front closing profile that can be removably fixed to the first frame and able to define and close a space inside the box-like body;
    wherein said front closing profile is equipped with a plurality of safety teeth and in that said first frame is equipped with a plurality of lateral flap, each safety tooth being able to be snapped into each lateral flap, and that said first frame is also provided with a plurality of thrust flaps configured to be compressed when the front closing profile is fixed to the first frame, and to facilitate the release of the front closing profile when a flat element, having apt thickness, is interposed between an edge of the front closing profile and the first frame.

2. The flush-to-wall electrical box according to claim 1, wherein said first frame is composed of a first profile and a second profile, said flush-to-wall electrical box comprising a net protruding beyond the perimeter edge and interposed between the first profile and the second.

3. The flush-to-wall electrical box according to claim 1, wherein said front closing profile is centrally perforated and configured to house a plasterboard closing panel.

4. The flush-to-wall electrical box according to claim 1, further comprising a net protruding beyond the perimeter edge of the box-like body and a thin profile ultrasonically welded on the first frame to block the net.

5. The flush-to-wall electrical box according to claim 1, further comprising a second frame underneath the first frame and fixed by screws housed in suitable cavities of the first frame, blocking the assembly constituted by the first frame, the second frame and body box-like.

6. The flush-to-wall electrical box according to claim 1, wherein the front closing profile comprises a perforated central portion having internal profiles such as to constitute a plastic cap.

7. The flush-to-wall electrical box according to claim 1, further comprising an adjustment system for adjusting the distance between the first frame and the box-like body.

8. The flush-to-wall electrical box according to claim 7, wherein said adjustment system comprises a plurality of screws housed in suitable seats placed at each corner of the box-like body, said screws enabling adjustment of the distance between the first frame and the box-like body, and therefore the overall thickness of the electrical box when installed.

9. The flush-to-wall electrical box according to claim 1, wherein said flat element is a card made of plastic material and having a substantially rectangular shape and thickness such as to interpose in the space between the front closing profile and the first frame, when the front closing profile is fixed to the first frame.

10. The flush-to-wall electrical box according to claim 1, configured for the fixing to a wall by the perimeter fixing walls and/or through holes formed in the bottom of the box-like body.

11. The flush-to-wall electrical box according to claim 1, further comprising at least a separator comprising two lower hooks which can be coupled to corresponding slots present on the bottom of the box-like body; a spacer for each side, which can be suitably spaced; a pre-cut upper wall that can be detached.

* * * * *